(12) United States Patent
Gutierrez

(10) Patent No.: US 11,086,809 B2
(45) Date of Patent: Aug. 10, 2021

(54) DATA TRANSFER ACCELERATION

(71) Applicant: ADVANCED MICRO DEVICES, INC., Santa Clara, CA (US)

(72) Inventor: Anthony Gutierrez, Bellevue, WA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/693,638

(22) Filed: Nov. 25, 2019

(65) Prior Publication Data

US 2021/0157756 A1    May 27, 2021

(51) Int. Cl.
  *G06F 13/36*   (2006.01)
  *G06F 13/362*  (2006.01)
  *G06F 11/34*   (2006.01)
  *G06F 11/30*   (2006.01)

(52) U.S. Cl.
  CPC ........ *G06F 13/362* (2013.01); *G06F 11/3037* (2013.01); *G06F 11/3476* (2013.01)

(58) Field of Classification Search
  CPC . G06F 13/362; G06F 11/3037; G06F 11/3476
  See application file for complete search history.

(56) References Cited

U.S. PATENT DOCUMENTS

| | | | |
|---|---|---|---|
| 10,638,202 B1* | 4/2020 | Khisti | H04L 63/0807 |
| 2006/0106894 A1* | 5/2006 | Richardson | G06F 16/273 |
| 2014/0040182 A1* | 2/2014 | Gilder | G06Q 40/12 707/602 |
| 2015/0261241 A1* | 9/2015 | McKeag | H02J 3/0073 700/295 |
| 2016/0293133 A1* | 10/2016 | Dutt | A63F 13/57 |
| 2018/0136979 A1* | 5/2018 | Morris | G06F 9/5027 |
| 2020/0014750 A1* | 1/2020 | Murstein | G06F 16/1873 |
| 2020/0019324 A1* | 1/2020 | Wang | G06F 3/0637 |

* cited by examiner

*Primary Examiner* — Henry Tsai
*Assistant Examiner* — Christopher A Daley

(57) ABSTRACT

Data transfer acceleration includes receiving, by a data transfer accelerator in a first node of a plurality of nodes, from a second node of the plurality of nodes, a request for data in a second state, wherein the second node stores an instance of the data in a first state; generating a message including one or more operations to transform the data from the first state to the second state; and sending the message to the second node in response to the request.

20 Claims, 6 Drawing Sheets

DATA TRANSFER ACCELERATION

STATEMENT REGARDING FEDERALLY SPONSORED RESEARCH OR DEVELOPMENT

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

Data transfer between nodes results in a performance loss and energy consumption. As data transfer frequency and size increases, the performance loss and energy consumption also increases.

DETAILED DESCRIPTION

Figure 1:
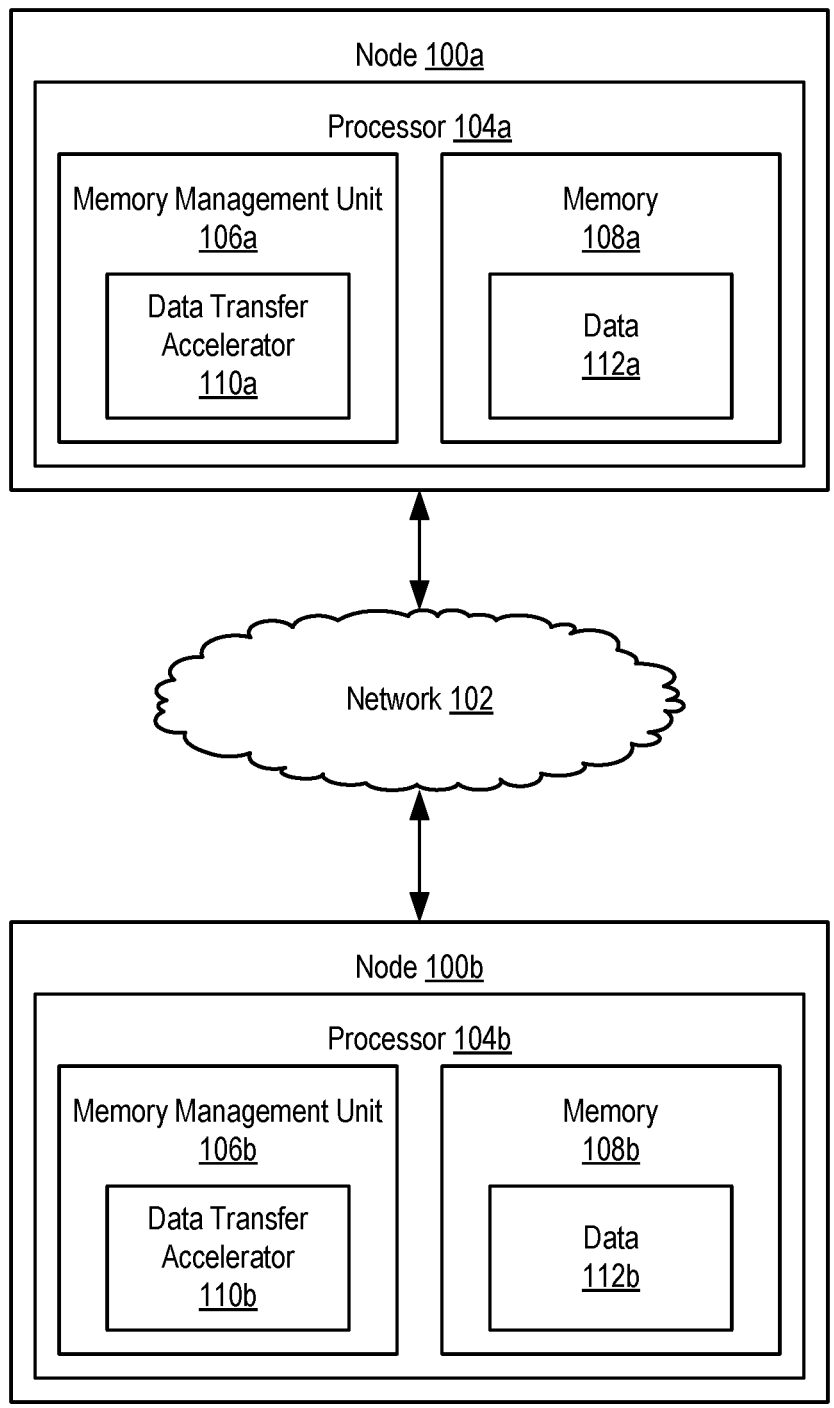
FIG. 1 is a block diagram of an example system for data transfer acceleration according to some embodiments.

In some embodiments, a method of data transfer acceleration includes receiving, by a data transfer accelerator in a first node of a plurality of nodes, from a second node of the plurality of nodes, a request for data in a second state, wherein the second node stores an instance of the data in a first state; generating a message including one or more operations to transform the data from the first state to the second state; and sending the message to the second node in response to the request.

In some embodiments, the second node includes another data transfer accelerator to effect the one or more operations on the data in the first state. In some embodiments, the method includes monitoring, by the data transfer accelerator, a memory of the first node to identify the one or more operations; storing the one or more operations in a log; and wherein generating the message includes generating the message based on the log. In some embodiments, the method includes identifying two or more inverse operations in the log; and removing the two or more inverse operations from the log. In some embodiments, the method includes identifying a plurality of idempotent operations in the log; and removing one or more of the idempotent operations from the log. In some embodiments, the method includes determining, by the data transfer accelerator, to send the message instead of the data in the second state. In some embodiments, determining to send the message instead of the data in the second state is based on one or more of: one or more heuristics associated with the data, or a registration of memory addresses associated with the data.

In some embodiments, a memory management unit for data transfer acceleration performs steps including receiving, by a data transfer accelerator in a first node of a plurality of nodes, from a second node of the plurality of nodes, a request for data in a second state, wherein the second node stores an instance of the data in a first state; generating a message including one or more operations to transform the data from the first state to the second state; and sending the message to the second node in response to the request.

In some embodiments, the second node includes another data transfer accelerator to effect the one or more operations on the data in the first state. In some embodiments, the steps include monitoring, by the data transfer accelerator, a memory of the first node to identify the one or more operations; storing the one or more operations in a log; and wherein generating the message includes generating the message based on the log. In some embodiments, the steps include identifying two or more inverse operations in the log; and removing the two or more inverse operations from the log. In some embodiments, the steps include identifying a plurality of idempotent operations in the log; and removing one or more of the idempotent operations from the log. In some embodiments, the steps include determining, by the data transfer accelerator, to send the message instead of the data in the second state. In some embodiments, determining to send the message instead of the data in the second state is based on one or more of: one or more heuristics associated with the data, or a registration of memory addresses associated with the data.

In some embodiments, a processor for data transfer acceleration includes a memory management unit including a data transfer accelerator to perform steps including receiving, by a data transfer accelerator in a first node of a plurality of nodes, from a second node of the plurality of nodes, a request for data in a second state, wherein the second node stores an instance of the data in a first state; generating a message including one or more operations to transform the data from the first state to the second state; and sending the message to the second node in response to the request.

In some embodiments, the second node includes another data transfer accelerator to effect the one or more operations on the data in the first state. In some embodiments, the steps include monitoring, by the data transfer accelerator, a memory of the first node to identify the one or more operations; storing the one or more operations in a log; and wherein generating the message includes generating the message based on the log. In some embodiments, the steps include identifying two or more inverse operations in the log; and removing the two or more inverse operations from the log. In some embodiments, the steps include identifying a plurality of idempotent operations in the log; and removing one or more of the idempotent operations from the log. In some embodiments, the steps include determining, by the data transfer accelerator, to send the message instead of the data in the second state. In some embodiments, determining to send the message instead of the data in the second state is based on one or more of: one or more heuristics associated with the data, or a registration of memory addresses associated with the data.

FIG. 1 is a block diagram of a non-limiting example system according to some embodiments. The example system 100 includes nodes 100a and 100b, which are connected via a network 102. The nodes 100a and 100b are computing devices, allocations of resources in a composite system, or other entities capable of independent computing operation. The nodes 100a and 100b each include processors 104a and 104b, respectively. The processors 104a and 104b include memory management units 106a and 106b, respectively. The memory management units 106a/b are components that handle various tasks associated with memory 108a/b, including address translation, virtual memory management, cache control, and other tasks. Accordingly, all operations or signals applied to memory 108a/b passes through the respective memory management unit 106a/b.

The processors 104a/b also include data transfer accelerators 110a/b. The data transfer accelerators 110a/b are programmable devices communicatively coupled to memory 108a/b that optimize data transfer between nodes 100a/b. The data transfer accelerators 110a/b are collocated with memory 108a/b. For example, the data transfer accelerators 110a/b may be implemented in memory management units 106a/b or implemented as separate devices on the processor 104a/b. The data transfer accelerators 110a/b may also be implemented in the memory 108a/b modules (e.g., in dual in-line memory modules (DIMMS)), in memory arrays, or otherwise implemented. For example, systems performing processing in memory (PIM) scenarios, near-data-processing (NDP) scenarios, or systems implementing resilient distributed datasets (RDD), parallel computation, etc., data is acted upon directly in memory 108a/b and transferred or shared between nodes 100a/b. Typically, where a given node requests data from another node, the entirety of the requested data is transferred. This results in unnecessary data transfer and power usage.

Data transfer accelerators (e.g., a data transfer accelerator 110a) receives a request for data (e.g., data 112a) stored in memory (e.g., memory 108a). The request is received from another data transfer accelerator (e.g., a data transfer accelerator 110b). For example, a message or signal generated by the processor 104b and/or the memory management unit 106b to request data 112a from the node 100a is provided to the data transfer accelerator 110b. The data transfer accelerator 110b then sends a request for the data 112a to the data transfer accelerator 110a via the network 102. The request identifies, for example, one or more memory addresses in the memory 108a (e.g., a range of memory addresses). The requested data 112a may correspond to a newer or updated version (e.g., a second state) of data 112b stored in the memory 108b of the node 100b requesting the data 112a (e.g., data 112b in a first state). The data transfer accelerator 110b may send requests at a predefined interval or in response to another event in order to maintain data synchronization across nodes 100a/b.

Instead of responding to the request with the data 112a itself, the data transfer accelerator 110a determines one or more operations to transform the data 112b from the first state to the second state (e.g., the state of the data 112a). For example, the data transfer accelerators 110a/b monitor updates or operations applied to memory 108a/b. The data transfer accelerators 110a/b monitor the entirety of memory 108a/b or one or more defined memory addresses or ranges of memory addresses. For example, the data transfer accelerators 110a/b may expose or implement an application program interface (API) allowing for a selection of memory addresses or ranges for monitoring. As operations are applied to memory 108a/b, the data transfer accelerators 110a/b record an indication of the performed operation in a log. Where the operations include data-parallel executed operations (e.g., where a same operation is applied to a range of arrays or other contiguous memory chunks), the operation may be stored as an indicated operation and an affected range of memory. Accordingly, the data transfer accelerator 110a determines the one or more operations based on the log. The application program interface also exposes other functionality, such as the deselection of memory addresses or ranges for monitoring, deletion of logs, etc. The log may be maintained or stored to facilitate reconstruction of data in the event of node failure or data loss.

For example, the data transfer accelerators 110a/b may send synchronization messages or other operations to ensure that data 112a/b is synchronized or coherent across nodes 100a/b. The determined one or more operations then correspond to those operations applied to the data 112a since the last synchronization message. As another example, the determined one or more operations are those operations applied since a last request from the node 100b. The determined one or more operations are then included in a message sent by the data transfer accelerator 110a to the data transfer accelerator 110b. The data transfer accelerator 110b then applies the one or more operations included in the message to transform the data 112b from the first state to the second state, thereby matching the state of the requested data 112a. The data transfer accelerator 110b may also inject or copy one or more values from the data 112b into a cache in response to applying the one or more operations.

The data transfer accelerators 110a/b optimize their respective logs to reduce the number of stored operations, thereby reducing the number of operations included in messages for application to data. For example, data transfer accelerators 110a/b identify, in the log, two or more inverse operations. Inverse operations are operations that, when applied, result in a same state as before applying the inverse operations, and therefore negate or cancel each other out. As an example, a first vector operation applied to a range of memory addresses increases each value in the range of memory addresses by a given increment. A second vector operation decreases each value in the range of memory addresses by an amount equal to the given increment. Accordingly, the first vector operation and the second vector operation cancel each other out. The two or more inverse operations are then removed from the log.

As another example, the data transfer accelerators 110a/b identify, in the log, a plurality of idempotent operations. Idempotent operations are those operations that may be applied multiple times but produce the same result as if applied once. Accordingly, the data transfer accelerators 110a/b remove one or more of the identified plurality of idempotent operations (e.g., remove all but one of the idempotent operations). The data transfer accelerators 110a/b also perform subexpression elimination on operations in the log to reduce the number of overall entries. Optimizations used in code compilations may also be used. For example, operations with no dependencies may be rearranged for optimal execution efficiency. The data transfer accelerators 110a/b may also apply compression to the logs.

Data transfer accelerators 110a/b determine whether to send requested data or the message indicating the one or more operations. For example, a data transfer accelerator 110a receiving a request for data 112a determines whether to send the requested data 112a or a message indicating one or more operations to be applied to data 112b. The determination may be based on heuristics. For example, the data transfer accelerator 110a may determine if the size of the message (e.g., based on a number of log entries or operators) exceeds the size of the requested data 110a/b. As another example, the data transfer accelerator 110a may determine if a number of operations to be included in the message exceeds a threshold. The determination may also be made based on a registration of memory addresses associated with the data 112a. For example, if all or a portion of the requested data 112a is outside of a registered group of memory addresses (e.g., registered via an application program interface), the data transfer accelerator 110a may then determine to send all or a portion of the requested data 112a instead of the corresponding operations.

Although the example system of FIG. 1 includes two nodes 100a/b, it is understood that additional nodes may also be included in the system each with a respective data transfer accelerator. Furthermore, although the example above discusses a data transfer accelerator 110a responding to requests from a data transfer accelerator 110b, it is understood that the data transfer accelerator 110b is also capable of similarly responding to requests from the data transfer accelerator 110a, or other data transfer accelerators as the number of nodes increases.

Figure 2:
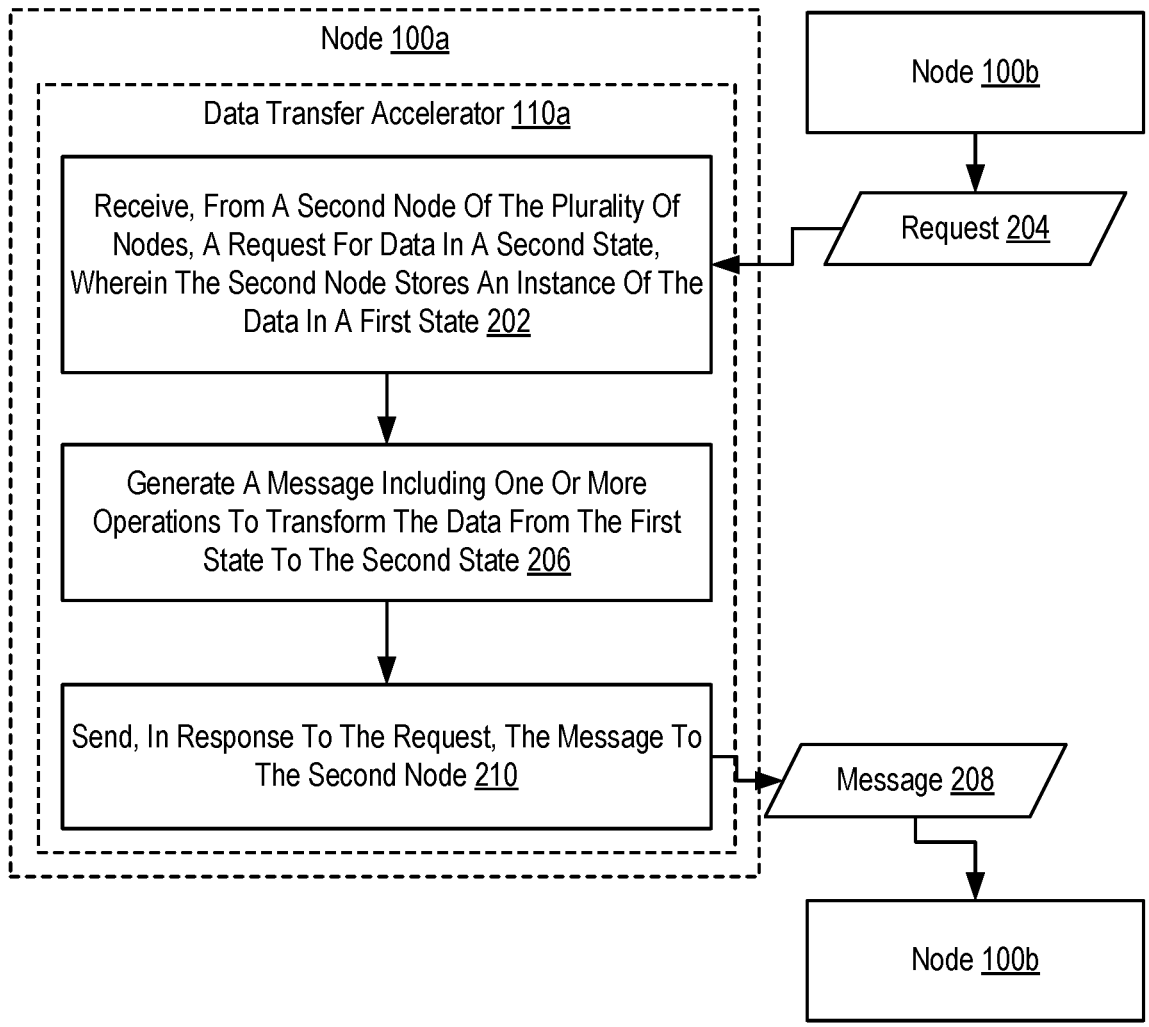
FIG. 2 is a flowchart of an example method for data transfer acceleration according to some embodiments.

For further explanation, FIG. 2 sets forth a flow chart illustrating an exemplary method for data transfer acceleration according to embodiments of the present disclosure that includes receiving 202 (e.g., by a data transfer accelerator 110a in a first node 100a), from a second node 100b of a plurality of nodes (e.g., from a data transfer accelerator 110b), a request 204 for data in a second state (e.g., data 112a), wherein the second node 100b stores an instance of the data in a first state (e.g., 112b). For example, a message or signal generated by a processor 104b and/or the memory management unit 106b to request data 112a from the node 100a is provided to the data transfer accelerator 110b. The data transfer accelerator 110b then sends a request 204 for the data 112a to the data transfer accelerator 110a via the network 102. The request 204 identifies, for example, one or more memory addresses in the memory 108a (e.g., a range of memory addresses). The requested data 112a may correspond to a newer or updated version (e.g., a second state) of data 112b stored in the memory 108b of the node 100b requesting the data 112a (e.g., data 112b in a first state). The requested data 112a may also correspond to data lost by a node 100b due to failure or entering an unresponsive state.

The method of FIG. 2 also includes generating 206 a message 208 including one or more operations to transform the data from the first state to the second state. The one or more operations correspond to one or more operations monitored or detected by the data transfer accelerator 110a as applied to the data. The method of FIG. 2 also includes sending 210, in response to the request 204, the message 208 to the second node 100b. The message 208 may include one or more headers or tags indicating, to a receiving data transfer accelerator 110b, that the message 208 payload includes operations to be applied to data (e.g., data 112b) stored in the node 100b instead of the requested data. Accordingly, the data transfer accelerator 110b of the receiving node 100b applies the operations indicated in the message 208 on the data stored in the second node to transform the data to the second state.

Figure 3:
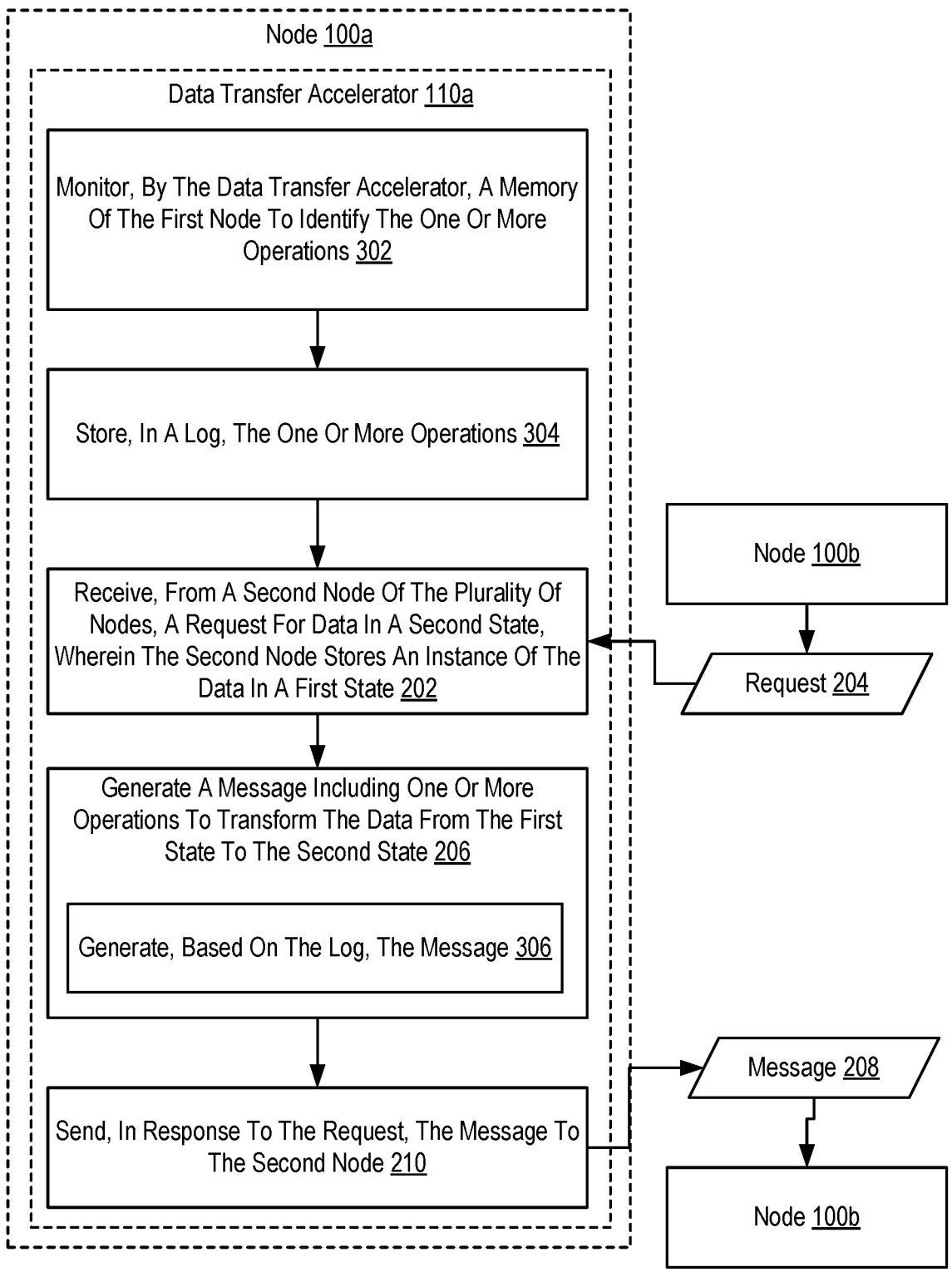
FIG. 3 is a flowchart of an example method for data transfer acceleration according to some embodiments.

For further explanation, FIG. 3 sets forth a flow chart illustrating an exemplary method for data transfer acceleration according to embodiments of the present disclosure that includes receiving 202 (e.g., by a data transfer accelerator 110a in a first node 100a), from a second node 100b of a plurality of nodes (e.g., from a data transfer accelerator 110b), a request 204 for data in a second state (e.g., data 112a), wherein the second node 100b stores an instance of the data in a first state (e.g., data 112b); generating 206 a message 208 including one or more operations to transform the data from the first state to the second state; and sending 210, in response to the request 204, the message 208 to the second node 100b.

The method of FIG. 3 differs from FIG. 2 in that the method of FIG. 3 also includes monitoring 302, by the data transfer accelerator 110a (e.g., of the first node 100a), a memory 108a of the first node 100a to identify the one or more operations. For example, the data transfer accelerator 110a receives operations applied by a memory management unit 106a to the memory 108a. The data transfer accelerator 110a may be implemented as part of the memory management unit 106a, or tap a communications pathway between the memory management unit 106a and the memory 108a. The data transfer accelerator 110a monitors the entirety of memory 108a or one or more defined memory addresses or ranges of memory addresses. For example, the data transfer accelerator 110a may expose or implement an application program interface (API) allowing for a selection of memory addresses or ranges for monitoring.

The method of FIG. 3 further differs from FIG. 2 in that the method of FIG. 3 also includes storing 304, in a log, the one or more operations. The log is stored in the data transfer accelerator 110a. Entries in the log may be accessed, deleted, or modified via an application program interface. Each entry in the log corresponds to a respective operation detected by the data transfer accelerator 110a as applied to the memory 108a. Where the operations include data-parallel executed operations (e.g., where a same operation is applied to a range of arrays or other contiguous memory chunks), the operation may be stored as an indicated operation and an affected range of memory.

The method of FIG. 3 further differs from FIG. 2 in that generating 206 a message 208 including one or more operations to transform the data from the first state to the second state includes generating 306, based on the log, the message 208. For example, the data transfer accelerator 110a includes, in the message, one or more logged operations performed since a last synchronization with the node 100b, since a last request from the node 100b, or since a time indicated in the request 204 (e.g., a time since a last update to data 110b stored in the memory 108b of the node 100b).

Figure 4:
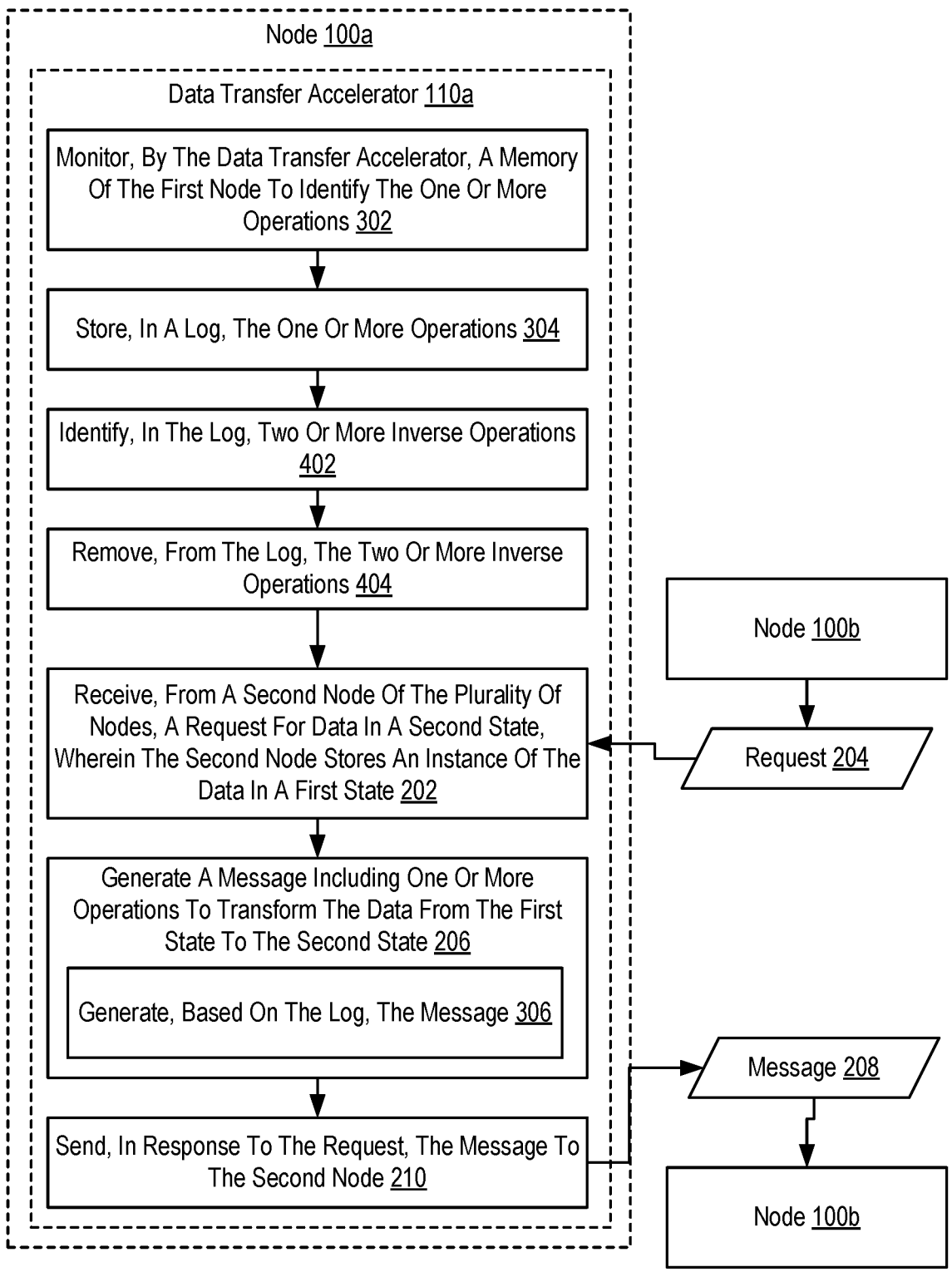
FIG. 4 is a flowchart of an example method for data transfer acceleration according to some embodiments.

For further explanation, FIG. 4 sets forth a flow chart illustrating an exemplary method for data transfer acceleration according to embodiments of the present disclosure that includes monitoring 302, by the data transfer accelerator 110a, a memory 108a of the first node 100a to identify the one or more operations; storing 304, in a log, the one or more operations; receiving 202 (e.g., by a data transfer accelerator 110a in a first node 100a), from a second node 100b of a plurality of nodes (e.g., from a data transfer accelerator 110b), a request 204 for data in a second state (e.g., data 112a), wherein the second node 100b stores an instance of the data in a first state (e.g., data 112b); generating 206 a message 208 including one or more operations to transform the data from the first state to the second state by generating 306, based on the log, the message 208; and sending 210, in response to the request 204, the message 208 to the second node 100b.

The method of FIG. 4 differs from FIG. 3 in that the method of FIG. 4 also includes identifying 402, in the log, two or more inverse operations. Inverse operations are operations that, when applied, result in a same state as before applying the inverse operations, and therefore negate or cancel each other out. Examples of inverse operations include incrementing and decrementing a value by a same amount, multiplying and dividing a value by the same amount, storing and deleting or removing a value, etc. The method of FIG. 4 further differs from FIG. 3 in that the method of FIG. 4 also includes removing 404, from the log, the two or more inverse operations. Thus, the number of entries in the log is reduced, thereby reducing the overall size of messages 208 generated from the log and reducing the number of operations applied by a data transfer accelerator 110b receiving the message 208.

Figure 5:
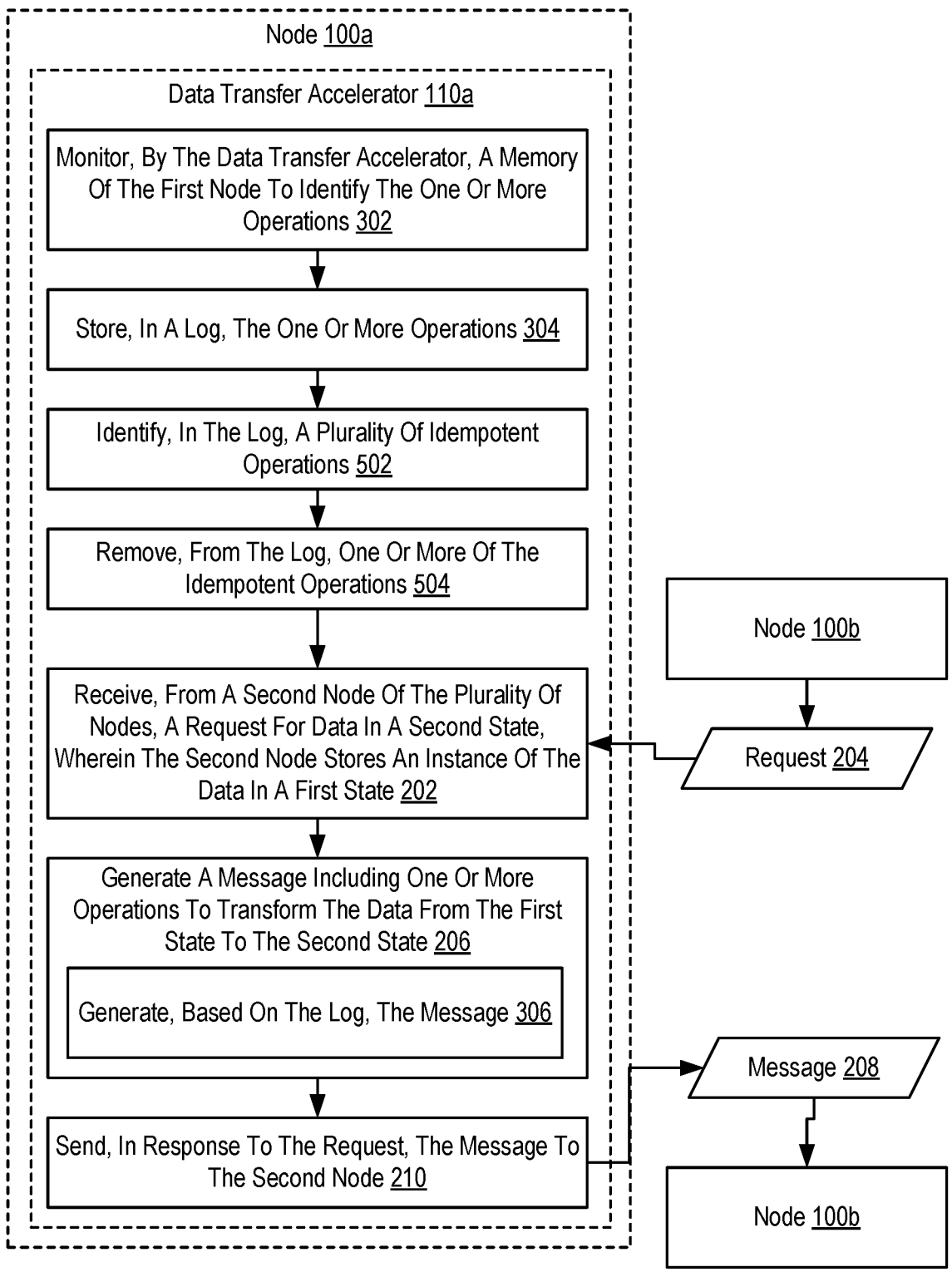
FIG. 5 is a flowchart of an example method for data transfer acceleration according to some embodiments.

For further explanation, FIG. 5 sets forth a flow chart illustrating an exemplary method for data transfer acceleration according to embodiments of the present disclosure that includes monitoring 302, by the data transfer accelerator 110a, a memory 108a of the first node 100a to identify the one or more operations; storing 304, in a log, the one or more operations; receiving 202 (e.g., by a data transfer accelerator 110a in a first node 100a), from a second node 100b of a plurality of nodes (e.g., from a data transfer accelerator 110b), a request 204 for data in a second state (e.g., data 112a), wherein the second node 100b stores an instance of the data in a first state (e.g., data 112b); generating 206 a message 208 including one or more operations to transform the data from the first state to the second state by generating 306, based on the log, the message 208; and sending 210, in response to the request 204, the message 208 to the second node 100b.

The method of FIG. 5 differs from FIG. 3 in that the method of FIG. 3 also includes identifying 502, in the log, a plurality of idempotent operations. Idempotent operations are those operations that may be applied multiple times but produce the same result as if applied once. The method of FIG. 5 further differs from FIG. 3 in that the method of FIG. 5 also includes removing 504, from the log, one or more of the idempotent operations (e.g., all but one of the idempotent operations). Thus, the number of entries in the log is reduced, thereby reducing the overall size of messages 208 generated from the log and reducing the number of operations applied by a data transfer accelerator 110b receiving the message 208.

Figure 6:
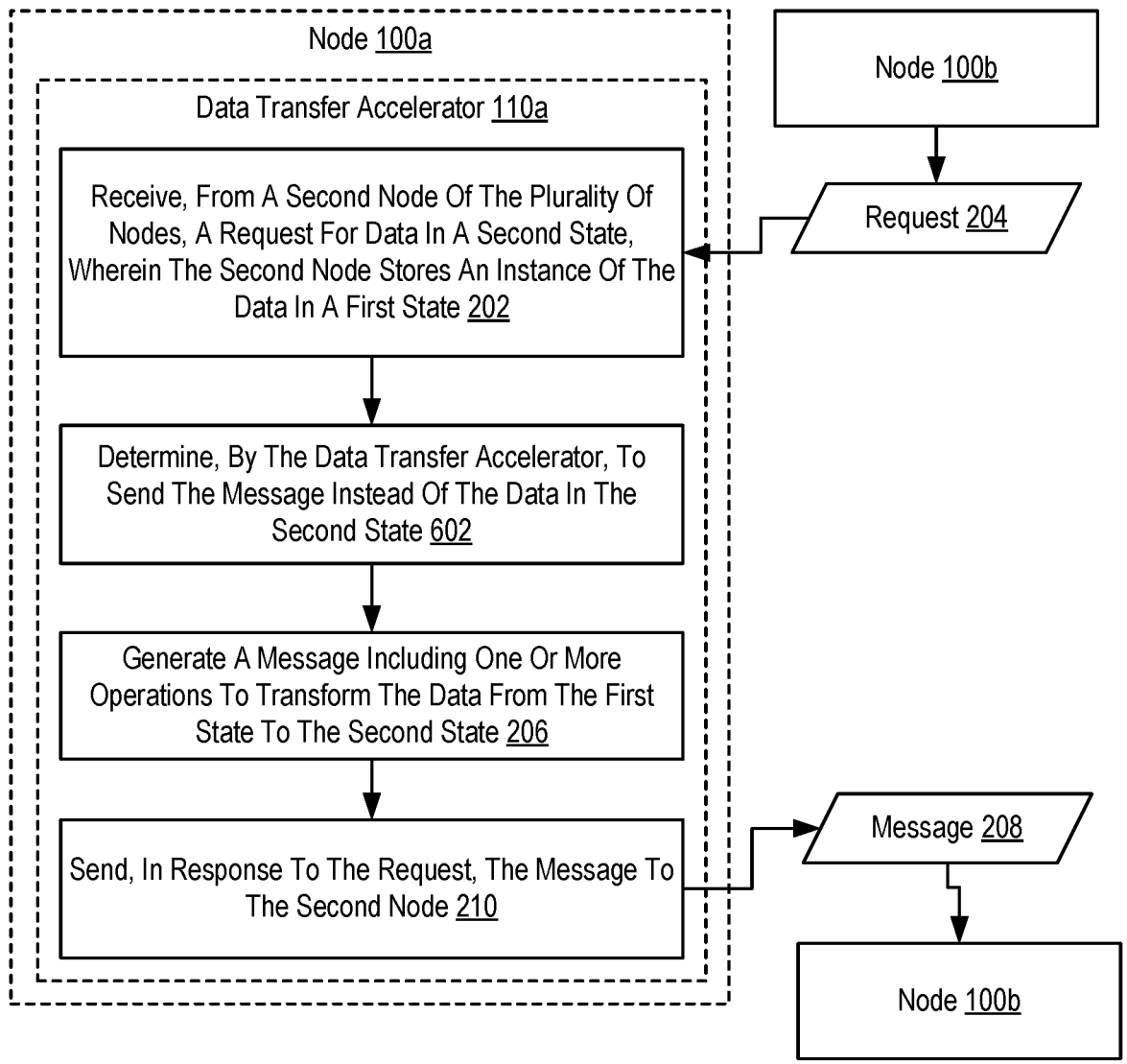
FIG. 6 is a flowchart of an example method for data transfer acceleration according to some embodiments.

For further explanation, FIG. 6 sets forth a flow chart illustrating an exemplary method for data transfer acceleration according to embodiments of the present disclosure that includes receiving 202 (e.g., by a data transfer accelerator 110a in a first node 100a), from a second node 100b of a plurality of nodes (e.g., from a data transfer accelerator 110b), a request 204 for data in a second state (e.g., data 112a), wherein the second node 100b stores an instance of the data in a first state (e.g., data 112b); generating 206 a message 208 including one or more operations to transform the data from the first state to the second state; and sending 210, in response to the request 204, the message 208 to the second node 100b.

The method of FIG. 6 differs from FIG. 2 in that the method of FIG. 6 also includes determining 602, by the data transfer accelerator 110a, to send the message 208 instead of the data in the second state (e.g., the requested data 112a stored in memory 108a of the node 100a). The determination may be based on heuristics. For example, the data transfer accelerator 110a may determine if the size of the message 208 (e.g., based on a number of log entries or operators) exceeds the size of the requested data. As another example, the data transfer accelerator 110a may determine if a number of operations to be included in the message exceeds a threshold. The determination may also be made based on a registration of memory addresses associated with the requested data. For example, if all or a portion of the requested data is outside of a registered group of memory addresses (e.g., registered via an application program interface), the data transfer accelerator 110a may then determine to send all or a portion of the requested data instead of the corresponding operations.

In view of the explanations set forth above, readers will recognize that the benefits of data transfer acceleration according to embodiments of the present disclosure include:

Improved performance of a computing system by reducing data transfer size when transferring data between nodes.

Improved performance of a computing system through reduced network and energy resource usage in data transfer between nodes.

Exemplary embodiments of the present disclosure are described largely in the context of a fully functional computer system for data transfer acceleration. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method of data transfer acceleration, the method comprising:
   receiving, by a data transfer accelerator in a first node of a plurality of nodes, from a second node of the plurality of nodes, a request for data in a second state, wherein the second node stores an instance of the data in a first state;
   generating a message comprising one or more operations, determined by the first node, to transform the data from the first state to the second state; and
   sending the message to the second node in response to the request, such that the data in the first node and the data in the second node will be synchronized using the information in the message.

2. The method of claim 1, wherein the second node comprises another data transfer accelerator configured to effect the one or more operations on the data in the first state.

3. The method of claim 1, further comprising:
   monitoring, by the data transfer accelerator, a memory of the first node to identify the one or more operations;
   storing the one or more operations in a log; and
   wherein generating the message comprises generating the message based on the log.

4. The method of claim 3, further comprising:
   identifying two or more inverse operations in the log; and
   removing the two or more inverse operations from the log.

5. The method of claim 3, further comprising:
   identifying a plurality of idempotent operations in the log; and
   removing one or more of the idempotent operations from the log.

6. The method of claim 1, further comprising determining, by the data transfer accelerator, to send the message instead of the data in the second state.

7. The method of claim 6, wherein determining to send the message instead of the data in the second state is based on one or more of: one or more heuristics associated with the data, or a registration of memory addresses associated with the data.

8. A memory management unit for data transfer acceleration, the memory management unit comprising:
a data transfer accelerator configured to:
receive, by the data transfer accelerator in a first node of a plurality of nodes, from a second node of the plurality of nodes, a request for data in a second state, wherein the second node stores an instance of the data in a first state;
generate a message comprising one or more operations, determined by the first node, to transform the data from the first state to the second state; and
send the message to the second node in response to the request, such that the data in the first node and the data in the second node will be synchronized using the information in the message.

9. The memory management unit of claim 8, wherein the second node comprises another data transfer accelerator configured to effect the one or more operations on the data in the first state.

10. The memory management unit of claim 8, wherein the data transfer accelerator is further configured to:
monitor, by the data transfer accelerator, a memory of the first node to identify the one or more operations;
store the one or more operations in a log; and
generate the message based on the log.

11. The memory management unit of claim 10, wherein the data transfer accelerator is further configured to:
identify two or more inverse operations in the log; and
remove the two or more inverse operations from the log.

12. The memory management unit of claim 10, wherein the data transfer accelerator is further configured to:
identify a plurality of idempotent operations in the log; and
remove one or more of the idempotent operations from the log.

13. The memory management unit of claim 8, wherein the data transfer accelerator is further configured to determine to send the message instead of the data in the second state.

14. The memory management unit of claim 13, wherein determining to send the message instead of the data in the second state is based on one or more of: one or more heuristics associated with the data, or a registration of memory addresses associated with the data.

15. A processor for data transfer acceleration, the processor comprising:
a memory management unit comprising a data transfer accelerator configured to:
receive, by the data transfer accelerator in a first node of a plurality of nodes, from a second node of the plurality of nodes, a request for data in a second state, wherein the second node stores an instance of the data in a first state;
generate a message comprising one or more operations, determined by the first node, to transform the data from the first state to the second state; and
send the message to the second node in response to the request, such that the data in the first node and the data in the second node will be synchronized using the information in the message.

16. The processor of claim 15, wherein the second node comprises another data transfer accelerator configured to effect the one or more operations on the data in the first state.

17. The processor of claim 15, wherein the data transfer accelerator is further configured to:
monitor a memory of the first node to identify the one or more operations;
store the one or more operations in a log; and
wherein generating the message comprises generating message based on the log.

18. The processor of claim 17, wherein the data transfer accelerator is further configured to:
identify two or more inverse operations in the log; and
remove the two or more inverse operations from the log.

19. The processor of claim 17, wherein the data transfer accelerator is further configured to:
identify a plurality of idempotent operations in the log; and
remove one or more of the idempotent operations from the log.

20. The processor of claim 15, wherein the data transfer accelerator is further configured to determine to send the message instead of the data in the second state.

* * * * *